(12) United States Patent
Kamado et al.

(10) Patent No.: US 12,577,759 B2
(45) Date of Patent: Mar. 17, 2026

(54) POSITION ESTIMATING SYSTEM, POSITION ESTIMATING UNIT, WORK MACHINE, AND EXTENSION UNIT

(71) Applicant: KOMATSU LTD., Tokyo (JP)

(72) Inventors: Mitsuhiko Kamado, Tokyo (JP); Takashi Sakai, Tokyo (JP)

(73) Assignee: KOMATSU LTD., Tokyo (JP)

( * ) Notice: Subject to any disclaimer, the term of this patent is extended or adjusted under 35 U.S.C. 154(b) by 238 days.

(21) Appl. No.: 18/550,198

(22) PCT Filed: Feb. 21, 2022

(86) PCT No.: PCT/JP2022/006921
§ 371 (c)(1),
(2) Date: Sep. 12, 2023

(87) PCT Pub. No.: WO2022/215373
PCT Pub. Date: Oct. 13, 2022

(65) Prior Publication Data
US 2024/0159023 A1 May 16, 2024

(30) Foreign Application Priority Data
Apr. 8, 2021 (JP) ................................ 2021-065967

(51) Int. Cl.
*E02F 9/26* (2006.01)
*E02F 3/32* (2006.01)
(Continued)

(52) U.S. Cl.
CPC ............... *E02F 9/264* (2013.01); *E02F 3/38* (2013.01); *G01B 21/22* (2013.01); *G01C 21/16* (2013.01); *E02F 3/32* (2013.01)

(58) Field of Classification Search
CPC ..... E02F 9/264; E02F 3/38; E02F 3/32; E02F 3/302; E02F 3/301; E02F 3/435;
(Continued)

(56) References Cited

U.S. PATENT DOCUMENTS 6,263,595 B1 * 7/2001 Ake ........................ E02F 9/264
356/141.3
6,755,604 B1 6/2004 Schaeff
(Continued)

FOREIGN PATENT DOCUMENTS

CN 102656323 A 9/2012
CN 105745381 A 7/2016
(Continued)

OTHER PUBLICATIONS

The International Search Report for the corresponding international application No. PCT/JP2022/006921, issued on May 10, 2022.
(Continued)

*Primary Examiner* — Anne Marie Antonucci
*Assistant Examiner* — Wesam Almadhrhi
(74) *Attorney, Agent, or Firm* — Spencer Fane LLP

(57) ABSTRACT

A position estimating system includes a first posture detector disposed in a linkage mechanism, and a controller that estimates information regarding the position of a bucket with respect to a work machine based on data regarding a shape of a first work implement, data regarding a shape of a second work implement, information regarding a posture of the first work implement, and a value detected by the first posture detector. The second work implement includes an extension part having a first end portion connectable to the bucket and a second end portion connectable to an arm. The linkage mechanism includes a first linkage part connected to the extension part through a first coupling portion, a second linkage part connected to the first linkage part through a second coupling portion, and a third linkage part disposed closer to the second end portion than the first linkage part.

11 Claims, 11 Drawing Sheets

(51) Int. Cl.
    *E02F 3/38*         (2006.01)
    *G01B 21/22*        (2006.01)
    *G01C 21/16*        (2006.01)

(58) Field of Classification Search
    CPC ........... E02F 9/22; G01B 21/22; G01C 21/16;
                                            B60Y 2200/412
    See application file for complete search history.

(56)                    References Cited

U.S. PATENT DOCUMENTS

| | | | | |
|---|---|---|---|---|
| 9,976,285 B2 * | 5/2018 | Padilla | .................... | E02F 3/435 |
| 2017/0260717 A1 | 9/2017 | Seki et al. | | |

FOREIGN PATENT DOCUMENTS

| | | | |
|---|---|---|---|
| JP | 55-23231 A | 2/1980 | |
| JP | 2003-119818 A | 4/2003 | |
| JP | 2016/056676 A1 | 4/2017 | |
| JP | 2017-181340 A | 10/2017 | |
| JP | 2019-132038 A | 8/2019 | |
| WO | 2016/056676 A1 | 4/2016 | |

OTHER PUBLICATIONS

First Office Action received for Chinese Application No. 202280018596.
0, mailed on Jul. 30, 2025, 11 pages.

* cited by examiner

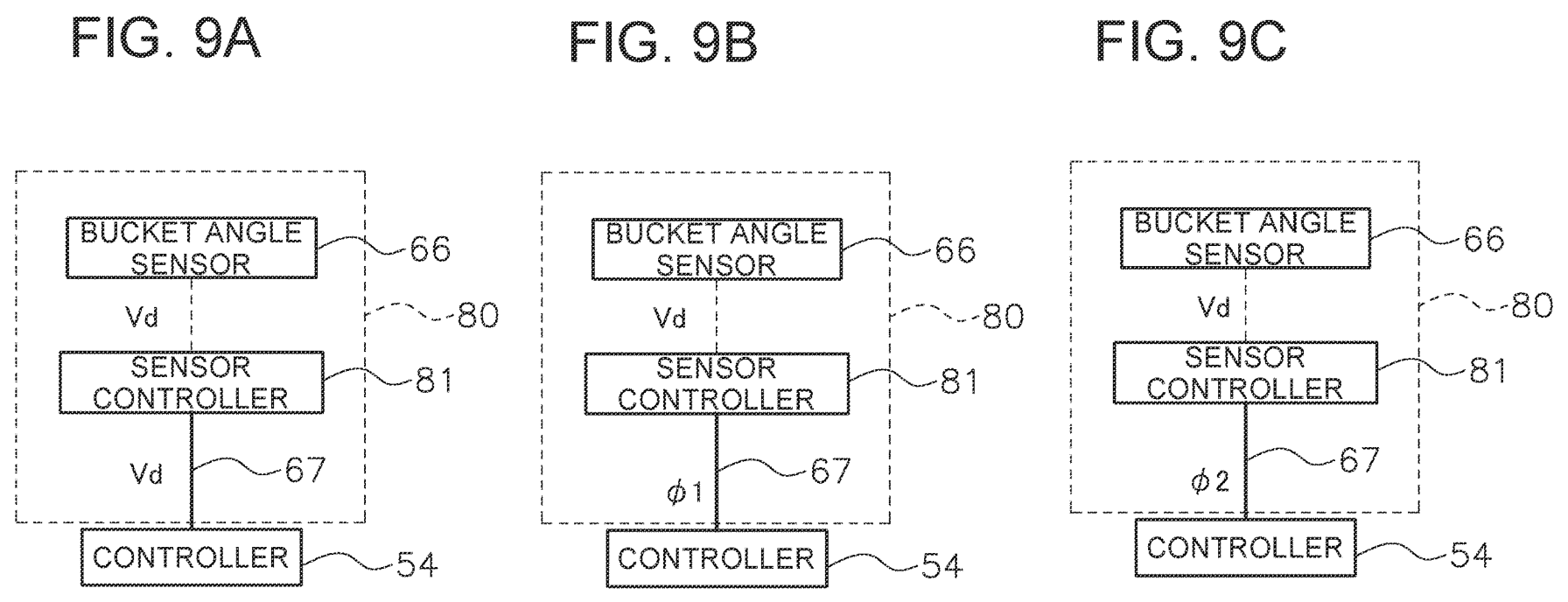

66 BUCKET ANGLE SENSOR

80

81 SENSOR CONTROLLER

67

Vd

Vd

54 CONTROLLER

FIG. 9B

66 BUCKET ANGLE SENSOR

80

81 SENSOR CONTROLLER

67

Vd $\phi 1$

54 CONTROLLER

FIG. 9C

66 BUCKET ANGLE SENSOR

80

81 SENSOR CONTROLLER

67

Vd $\phi 2$

54 CONTROLLER

POSITION ESTIMATING SYSTEM, POSITION ESTIMATING UNIT, WORK MACHINE, AND EXTENSION UNIT

CROSS-REFERENCE TO RELATED APPLICATIONS

This application is a U.S. National stage application of International Application No. PCT/JP2022/006921, filed on Feb. 21, 2022. This U.S. National stage application claims priority under 35 U.S.C. § 119(a) to Japanese Patent Application No. 2021-065967, filed in Japan on Apr. 8, 2021, the entire contents of which are hereby incorporated herein by reference.

BACKGROUND

Field of the Invention

The present disclosure relates to a position estimating system, a position estimating unit, a work machine, and an extension unit.

Background Information

There has been known a technology for calculating the position of the cutting edge of a bucket in a work machine including a work implement. For example, a work machine described in Domestic Re-publication of PCT International Application No. WO2016/056676 includes a vehicle body and a work implement. In order to detect the position of the vehicle body, an antenna for a GNSS (Global Navigation Satellite System), for instance, is mounted to the vehicle body. Besides, an IMU (Inertial Measurement Unit), for instance, is disposed in the vehicle body. The IMU detects the roll angle, the pitch angle, and so forth of the vehicle body. The work implement includes a boom, an arm, a bucket, and hydraulic cylinders for driving the components. A controller for the work machine calculates the position of the cutting edge of the bucket based on the position and posture of the vehicle body, the dimensions of components of the work implement, the pivot angles of the components of the work implement, and so forth.

Domestic Re-publication of PCT International Application No. WO2016/056676 describes that, in order to detect the pivot angles of the components of the work implement, angular sensors are attached to pivot portions of the work implement, respectively.

Besides, when an extension arm is attached to the work machine in order to extend the work range of the work machine, the position of the cutting edge of the bucket is calculated based on correction made by inputting the dimensions of components of the extension arm.

SUMMARY

However, even when such a work as dredging is performed by the work machine to which the extension arm is attached, if the angular sensors are attached to the bucket and a bucket pin, the angular sensor-attached portions have chances of being submerged; hence, the angular sensors have high chances of being damaged or broken, and therefore, have been required to be strongly protected so as not to be damaged or broken.

It is an object of the present disclosure to provide a position estimating system, a position estimating unit, a work machine, and an extension unit, all of which are unlikely to be affected by works.

A position estimating system according to a first aspect of the present disclosure relates to a position estimating system estimating information regarding a position of a bucket of a work machine and includes a first position detector and a controller. Here, the work machine includes a work machine body, a first work implement, and a second work implement. The first work implement includes an arm, the bucket, and a bucket cylinder driving the bucket and is pivotable with respect to the work machine body. The second work implement includes a linkage mechanism transferring driving of the bucket cylinder to the bucket and is attachable to the arm and the bucket in a position therebetween. The first posture detector is enabled to be disposed in the linkage mechanism. The controller estimates information regarding the position of the bucket with respect to the work machine based on data regarding a shape of the first work implement, data regarding a shape of the second work implement, information regarding a posture of the first work implement, and a value detected by the first posture detector. The second work implement includes an extension part. The extension part includes a first end portion connectable to the bucket and a second end portion connectable to the arm. The linkage mechanism includes a first linkage part, a second linkage part, and a third linkage part. The first linkage part is connected to the extension part through a first coupling portion and is connectable through a second coupling portion to a bucket linkage part connected to the bucket. The second linkage part is connected to the first linkage part through the second coupling portion and extends toward a side of the second end portion. The third linkage part is disposed closer to the second end portion than the first linkage part, is connected to the extension part through a third coupling portion, and is connected to the second linkage part through a fourth coupling portion.

A position estimating unit according to a second aspect of the present disclosure relates to a position estimating unit estimating information regarding a position of a bucket of a work machine and includes a first posture detector and a detector controller. Here, the work machine includes a work machine body, a first work implement, and a second work implement. The first work implement includes an arm, the bucket, and a bucket cylinder driving the bucket and is pivotable with respect to the work machine body. The second work implement includes a linkage mechanism transferring driving of the bucket cylinder to the bucket and is attachable to the arm and the bucket in a position therebetween. The first posture detector is enabled to be disposed in the linkage mechanism. The detector controller obtains a value detected by the first posture detector and transmits information based on the value detected by the first posture detector to the work machine body. The second work implement includes an extension part. The extension part includes a first end portion connectable to the bucket and a second end portion connectable to the arm. The linkage mechanism includes a first linkage part, a second linkage part, and a third linkage part. The first linkage part is connected to the extension part through a first coupling portion and is connectable through a second coupling portion to a bucket linkage part connected to the bucket. The second linkage part is connected to the first linkage part through the second coupling portion and extends toward a side of the second end portion. The third linkage part is disposed closer to the second end portion than the first linkage part, is connected to the extension part through a third coupling portion, and is connected to the second linkage part through a fourth coupling portion.

A work machine according to a third aspect of the present disclosure includes a work machine body, a first work implement, a second work implement, a first posture detector, and a controller. The first work implement includes an arm, a bucket, and a bucket cylinder driving the bucket and is pivotable with respect to the work machine body. The second work implement includes a linkage mechanism transferring driving of the bucket cylinder to the bucket and is attachable to the arm and the bucket in a position therebetween. The first posture detector is disposed in the linkage mechanism. The controller estimates information regarding a position of the bucket with respect to the work machine body based on data regarding a shape of the first work implement, data regarding a shape of the second work implement, information regarding a posture of the first work implement, and a value detected by the first posture detector. The second work implement includes an extension part. The extension part includes a first end portion connectable to the bucket and a second end portion connectable to the arm. The linkage mechanism includes a first linkage part, a second linkage part, and a third linkage part. The first linkage part is connected to the extension part through a first coupling portion and is connectable through a second coupling portion to a bucket linkage part connected to the bucket. The second linkage part is connected to the first linkage part through the second coupling portion and extends toward a side of the second end portion. The third linkage part is disposed closer to the second end portion than the first linkage part, is connected to the extension part through a third coupling portion, and is connected to the second linkage part through a fourth coupling portion.

An extension unit according to a fourth aspect of the present disclosure includes an extension arm and a first posture detector. The extension arm includes an extension part and a linkage mechanism. Then extension part includes a first end portion connectable to the bucket and a second end portion connectable to the arm. The linkage mechanism transfers driving of the bucket cylinder to the bucket. The linkage mechanism includes a first linkage part, a second linkage part, and a third linkage part. The first linkage part is connected to the extension part through a first coupling portion and is connectable through a second coupling portion to a bucket linkage part connected to the bucket. The second linkage part is connected to the first linkage part through the second coupling portion and extends toward a side of the arm. The third linkage part is disposed closer to the second end portion than the first linkage part, is connected to the extension part through a third coupling portion, and is connected to the second linkage part through a fourth coupling portion.

According to the present disclosure, it is made possible to provide a position estimating system, a position estimating unit, a work machine, and an extension unit, all of which are unlikely to be affected by works.

BRIEF DESCRIPTION OF THE DRAWINGS

FIG. 4A is a diagram showing a side view of a bucket in the preferred embodiment according to the present disclosure and FIG. 4B is a diagram showing a condition of the bucket from which a near-side one of lateral surface portions is detached in the diagram FIG. 4A.

FIG. 9A, FIG. 9B and FIG. 9C are diagrams showing information to be transmitted to a vehicle body from a position estimating unit in another preferred embodiment according to the present disclosure.

FIG. 11A is a diagram showing a plan view of a condition that a bucket angular sensor is disposed in a third linkage part in another preferred embodiment according to the present disclosure and FIG. 11B is a diagram showing a side view of a condition that the bucket angular sensor is disposed in the third linkage part in another preferred embodiment according to the present disclosure.

DETAILED DESCRIPTION OF EMBODIMENT(S)

A position estimating system, a work machine, and an extension unit according to a preferred embodiment of the present disclosure will be hereinafter explained with reference to drawings.

(Overview of Work Machine 1)

Figure 1:
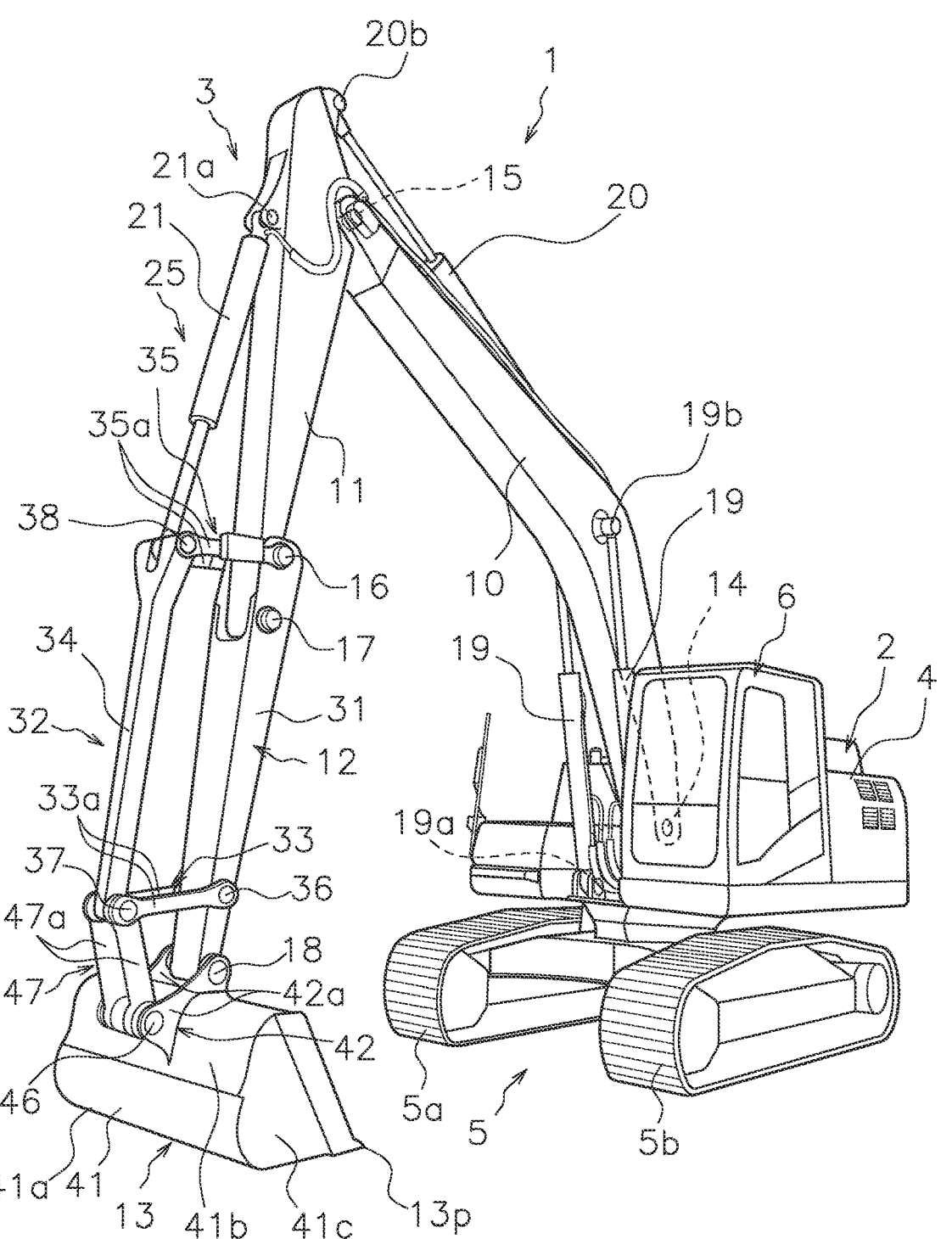
FIG. 1 is a perspective view of a work machine in a preferred embodiment according to the present disclosure.

FIG. 1 is a perspective view of a work machine 1 according to the preferred embodiment.

Figure 5:
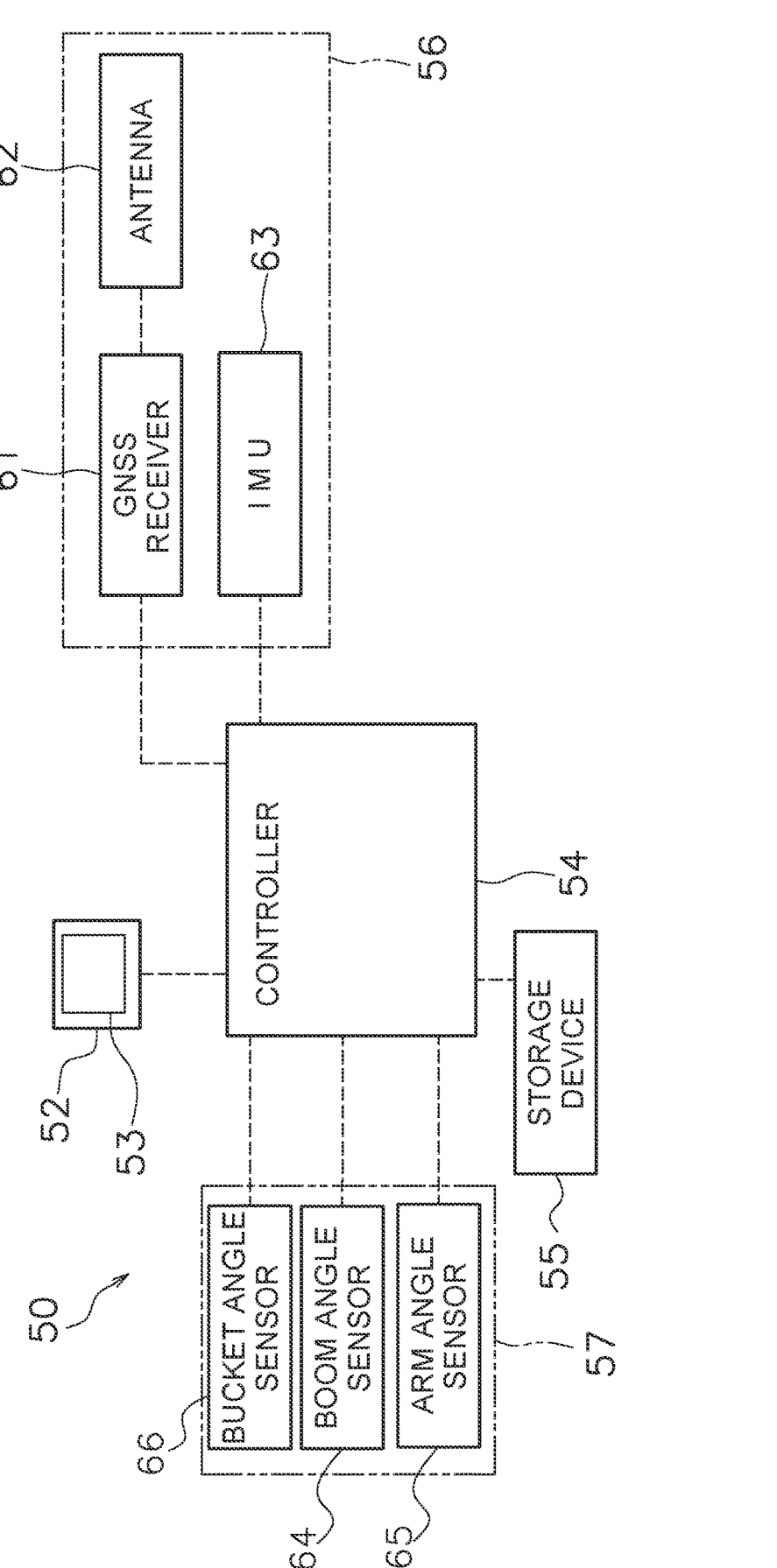
FIG. 5 is a block diagram showing a configuration of a position estimating system in the preferred embodiment according to the present disclosure.

The work machine 1 mainly includes a vehicle body 2 (exemplary work machine body), a work implement 3, and a position estimating system 50 (see FIG. 5). The vehicle body 2 includes a revolving unit 4 and a traveling unit 5. The revolving unit 4 is supported by the traveling unit 5 so as to be capable of revolving relative thereto. A cab 6 is disposed on the revolving unit 4. The traveling unit 5 includes crawler belts 5a and 5b. The work machine 1 travels by circulating the crawler belts 5a and 5b.

(Work Implement 3) The work implement 3 is attached to the vehicle body 2.

The work implement 3 includes a first work implement 25 and an extension arm 12 (exemplary second work implement). The extension arm 12 is configured to be attachable to and detachable from the first work implement 25.

The first work implement 25 includes a boom 10, an arm 11, and a bucket 13.

The boom 10 is rotatably attached at the base end thereof to the vehicle body 2 through a boom pin 14. The arm 11 is rotatably attached at the base end thereof to the distal end of the boom 10 through an arm pin 15. The extension arm 12 is attached at the base end thereof to the distal end of the arm 11 through two coupling pins 16 and 17. The bucket 13 is rotatably attached to the distal end of the extension arm 12 through a bucket pin 18.

The work implement 3 includes a pair of boom cylinders 19, an arm cylinder 20, and a bucket cylinder 21. Each of the boom cylinders 19, the arm cylinder 20, and the bucket cylinder 21 is a hydraulic cylinder.

The pair of boom cylinders 19 is disposed to sandwich the boom 10 therebetween. Each of the boom cylinders 19 is rotatably attached at the bottom-side end thereof to the revolving unit 4 through a boom cylinder foot pin 19a. Each of the boom cylinders 19 is rotatably attached at the rod-side end thereof to the boom 10 through a boom cylinder top pin 19b.

The arm cylinder 20 is attached at the bottom-side end thereof to the boom 10 through an arm cylinder foot pin (not shown in the drawings). The arm cylinder 20 is attached at the rod-side end thereof to the arm 11 through an arm cylinder top pin 20b.

The bucket cylinder 21 is attached at the bottom-side end thereof to the arm 11 through a bucket cylinder foot pin 21a. The bucket cylinder 21 is attached at the rod-side end thereof to the extension arm 12 through a third linkage pin 38 (to be described).

When the boom cylinders 19 are expanded and contracted, the boom 10 is actuated. When the arm cylinder 20 is expanded and contracted, the arm 11 and the extension arm 12 are actuated. When the bucket cylinder 21 is expanded and contracted, the bucket 13 is actuated.

(Extension Arm 12)

Figure 2:
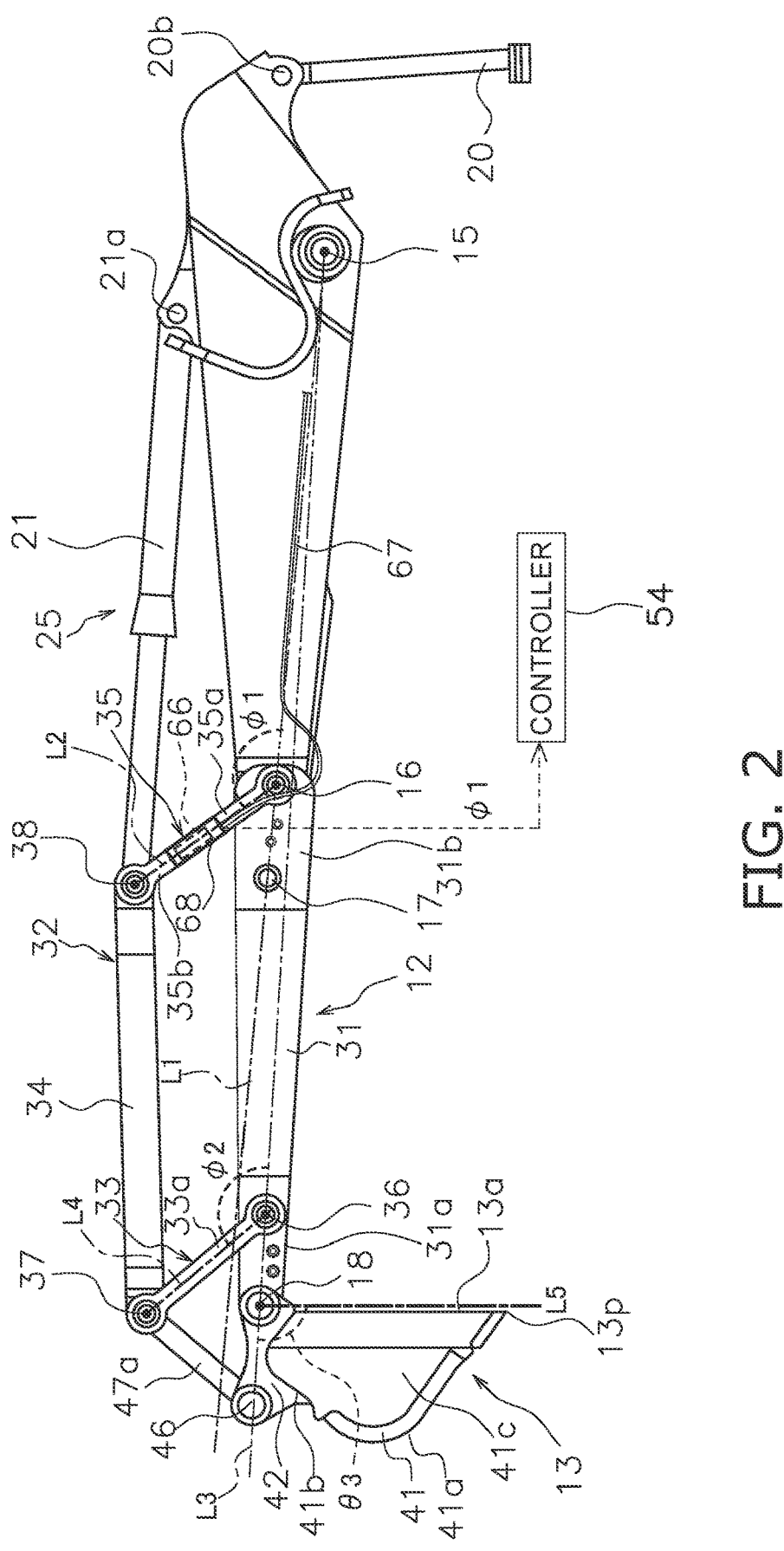
FIG. 2 is a side view of a work implement in the preferred embodiment according to the present disclosure.
Figure 3:
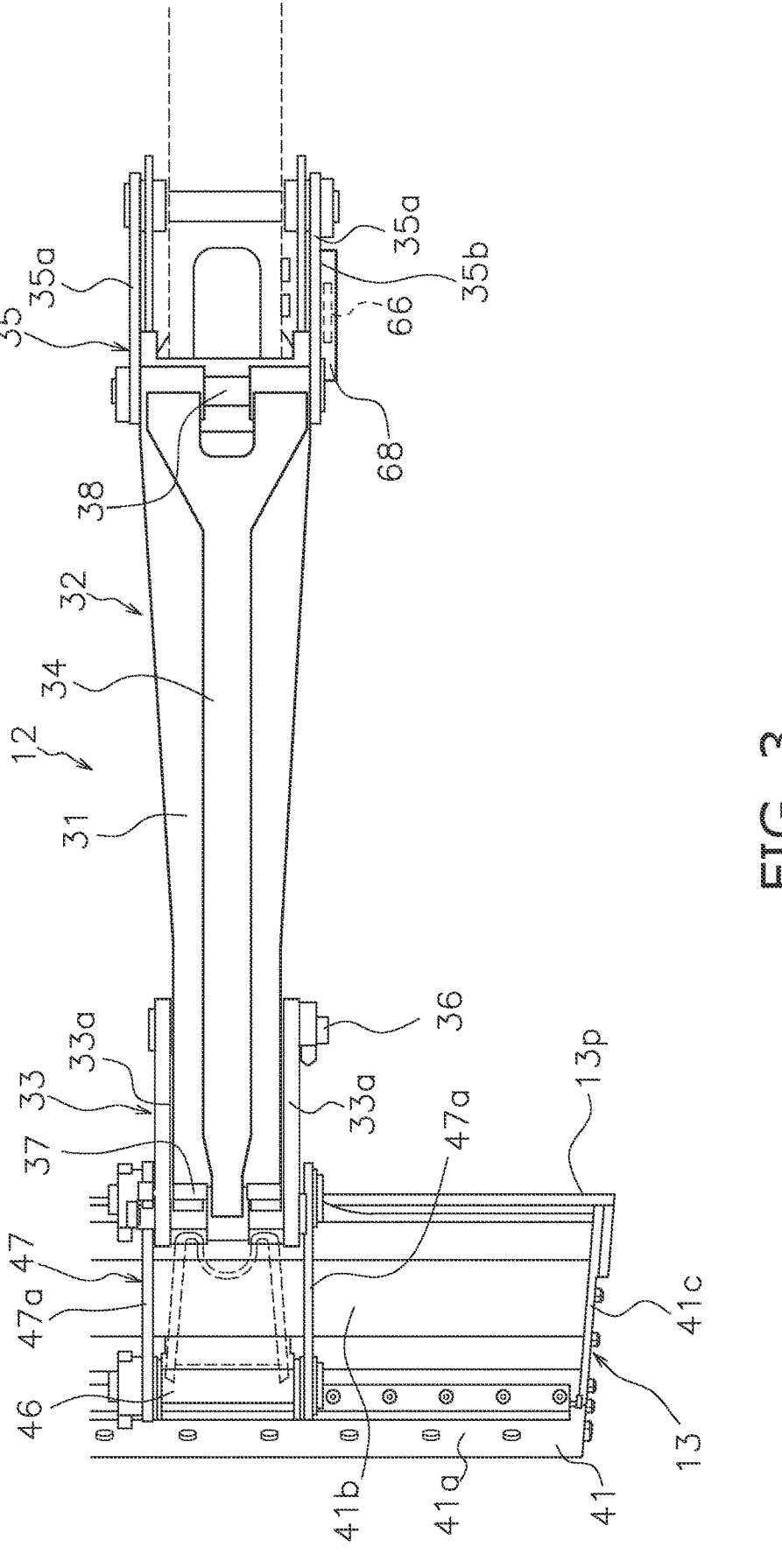
FIG. 3 is a plan view of the work implement in the preferred embodiment according to the present disclosure.

FIG. 2 is a side view of the work implement 3. FIG. 3 is a plan view of the work implement 3 shown in FIG. 2.

The extension arm 12 includes an extension part 31 and a linkage mechanism 32.

The extension part 31 is attached to the arm 11 and the bucket 13 in a position therebetween. The extension part 31 includes a base end portion 31b (exemplary second end portion), which is attached to the arm 11, and a distal end portion 31a (exemplary first end portion), to which the bucket 13 is attached.

The extension part 31 is attached at the base end portion 31b to the arm 11 through the coupling pins 16 and 17. The coupling pins 16 and 17 are disposed to be aligned along the longitudinal direction of the arm 11. The coupling pin 16 is disposed closer to the base end of the arm 11 than the coupling pin 17.

The bucket 13 is attached to the distal end portion 31a of the extension part 31 through the bucket pin 18.

The linkage mechanism 32 transfers expansion and contraction of the bucket cylinder 21 to the bucket 13. The linkage mechanism 32 is attached to the extension part 31. The linkage mechanism 32 includes a first linkage part 33, a second linkage member 34 (exemplary second linkage part), and a third linkage part 35.

The first linkage part 33 is disposed on the distal end portion 31a of the extension part 31. As shown in FIG. 3, the first linkage part 33 includes a pair of first linkage members 33a disposed to sandwich the extension part 31 therebetween. As shown in FIG. 2, each of the first linkage members 33a is rotatably connected at one end thereof to a lateral surface of the extension part 31 through a first linkage pin 36 (exemplary first coupling portion) in a position located closer to the base end portion 31b than the bucket pin 18. Each of the first linkage members 33a is rotatably connected at the other end thereof to each of a pair of bucket linkage members 47a, rotatably connected to the bucket 13, through a second linkage pin 37 (exemplary second coupling portion).

The second linkage member 34 is rotatably connected at one end thereof to the other ends of the pair of first linkage members 33a through the second linkage pin 37. The second linkage member 34 is a member shaped to extend toward the side of the base end portion 31b from a portion thereof in which the second linkage pin 37 is disposed. The second linkage member 34 is rotatably connected at the other end thereof to the rod-side distal end of the bucket cylinder 21 through the third linkage pin 38.

The third linkage part 35 is disposed closer to the arm 11 (the base end portion 31b) than the first linkage part 33. In the present preferred embodiment, the third linkage part 35 is disposed on the base end portion 31b. As shown in FIG. 3, the third linkage part 35 includes a pair of third linkage members 35a disposed to sandwich the extension part 31 therebetween. Each of the third linkage members 35a is rotatably connected at one end thereof to the other end of the second linkage member 34 and the rod-side distal end of the bucket cylinder 21 through the third linkage pin 38 (exemplary fourth coupling portion). Each of the third linkage members 35a is rotatably connected at the other end thereof to the lateral surface of the extension part 31 through the coupling pin 16 (exemplary third coupling portion).

In the present preferred embodiment, a line segment L2 connecting the coupling pin 16 and the third linkage pin 38 is different in length from a line segment L4 connecting the first linkage pin 36 and the second linkage pin 37; specifically, the line segment L2 is set to be greater in length than the line segment L4. Because of this, the linkage mechanism 32 is made in form of a four-bar linkage including, as joints thereof, the first linkage pin 36, the second linkage pin 37, the third linkage pin 38, and the coupling pin 16 but is not made in form of a parallelogram linkage.

(Bucket 13)

Figures 4A, 4B:
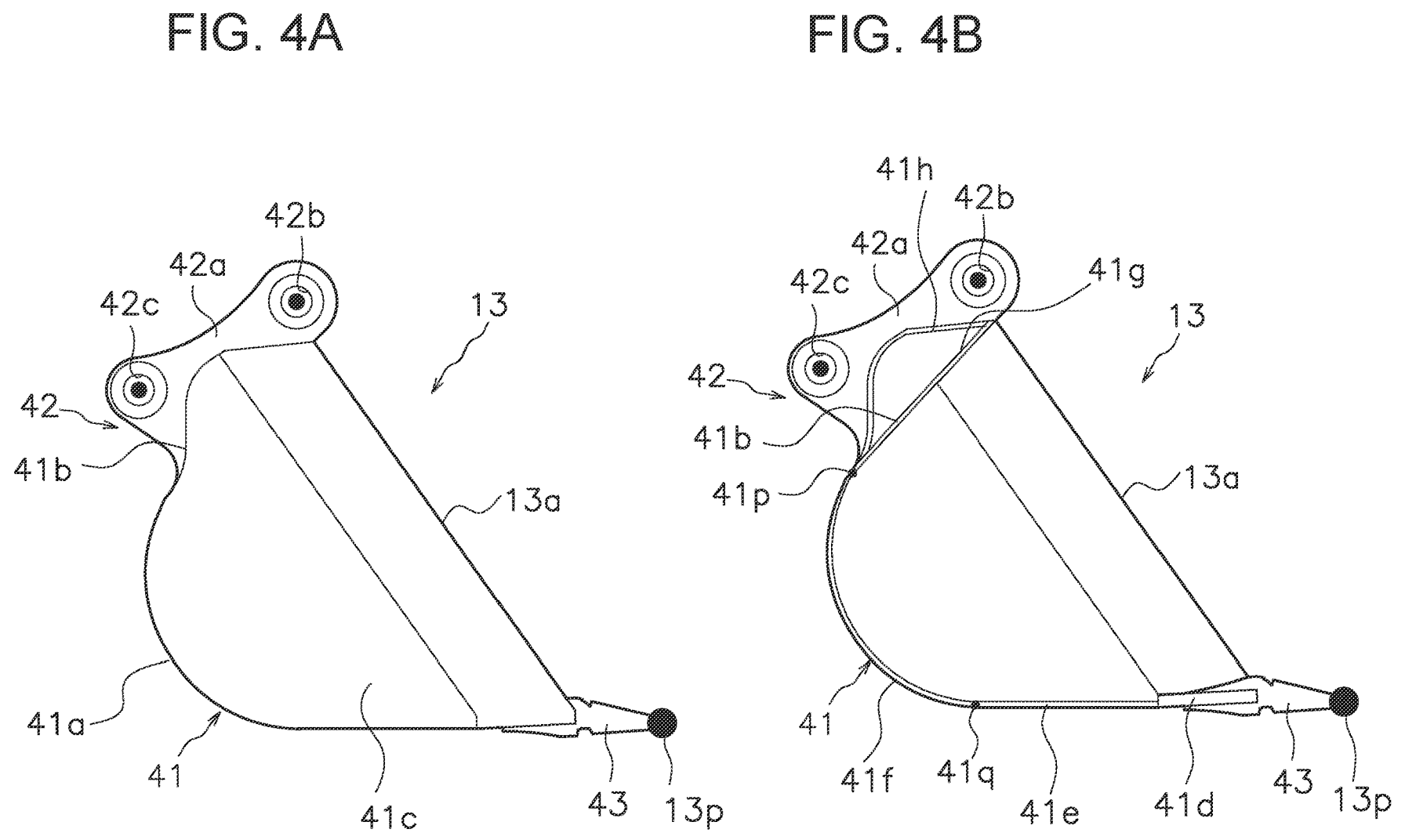

FIG. 4A is a side view of the bucket 13. The bucket 13 includes a bucket body 41, a connection part 42, and teeth 43. The connection part 42 is connected to the bucket body 41 and includes a portion to be attached to the extension arm 12.

The teeth 43 are connected to the bucket body 41. A cutting edge 13p of the bucket 13 is located on the distal end of the teeth 43. The bucket body 41 mainly includes a bottom surface part 41a, a rear surface part 41b, and a pair of sidewall parts 41c. FIG. 4B is a diagram showing a condition of the bucket 13 from which a near-side one of the sidewall parts 41c is detached in FIG. 4A.

The bottom surface part 41a has a curved shape in the side view. The rear surface part 41b continues at a position 41p to the bottom surface part 41a. The pair of sidewall parts 41c is disposed in opposition to each other and laterally covers a space enclosed by the bottom surface part 41a and the rear surface part 41b. The space, enclosed by the bottom surface part 41a, the rear surface part 41b, and the pair of sidewall parts 41c, has a portion opened to the external space as an opening portion 13a shown in the drawings.

As shown in FIG. 4B, the bottom surface part 41a includes a front lip 41d, a front surface portion 41e, and a curved portion 41f. The front surface portion 41e is a flat plate-shaped portion and has a straight shape in the side view. The curved portion 41f is a curved plate-shaped portion and has a curved shape protruding to the outside of the bucket body 41 in the side view. The curved portion 41f continues at a position 41q to the front surface portion 41e.

The front lip 41d is a flat plate-shaped member and has a straight shape in the side view. The front lip 41d is fixed to an end of the front surface portion 41e that is disposed on the opposite side of the position 41q. The front lip 41d is greater in thickness than the front surface portion 41e. The front lip 41d is a member to which the teeth 43 are fixed.

The rear surface part 41*b* includes a first member 41*g* and a second member 41*h*. The first member 41*g* has a plate shape and continues at the position 41*p* to the curved portion 41*f* of the bottom surface part 41*a*. The second member 41*h* is disposed outside the first member 41*g* and includes a portion curved to protrude outward.

The connection part 42 is disposed on the rear surface part 41*b*. The connection part 42 includes a pair of brackets 42*a* (see FIG. 1). The pair of brackets 42*a* is disposed in opposition to each other in the width direction. As shown in FIGS. 4(*a*) and 4(*b*), the brackets 42*a* are fixed to the rear surface part 41*b*. The brackets 42*a* stand to protrude outward from the rear surface part 41*b*. Each of the brackets 42*a* includes a first hole 42*b* and a second hole 42*c*. As shown in FIG. 2, the bucket pin 18 is inserted into the first hole 42*b* perforated on the opening portion 13*a* side. A bucket linkage pin 46, provided for attaching the bucket 13 to a bucket linkage part 47, is inserted into the second hole 42*c* perforated on the bottom surface part 41*a* side.

It should be noted that, as shown in FIG. 1, the bucket linkage part 47 includes the pair of bucket linkage members 47*a*. Each of the bucket linkage members 47*a* is rotatably connected at one end thereof to each of the brackets 42*a* through the bucket linkage pin 46. Each of the bucket linkage members 47*a* is rotatably connected at the other end thereof to each of the first linkage members 33*a* and the second linkage member 34 through the second linkage pin 37. The teeth 43 are disposed on the distal end of the bottom surface part 41*a* that is disposed on the opposite side of the rear surface part 41*b*.

(Position Estimating System 50)

FIG. 5 is a block diagram showing a configuration of the position estimating system 50.

As shown in FIG. 5, the position estimating system 50 includes an input device 52, a display 53, a controller 54, a storage device 55, a position sensor 56 (exemplary status detector), and a posture sensor 57.

The input device 52 and the display 53 are disposed in the cab 6. The input device 52 receives an operation inputted by an operator to perform control settings for the work machine 1 and outputs an operating signal in response to the operation. The input device 52 is, for instance, a touchscreen. Alternatively, the input device 52 may include one or more levers and/or one or more switches. The operator is enabled to input shape data of the vehicle body 2 and shape data of the work implement 3 by using the input device 52. For example, when the extension arm 12 is attached anew, the operator is enabled to input the shape data of the extension arm 12 by using the input device 52.

The display 53 displays an image depending on a command signal inputted to the input device 52. The display 53 displays a guide screen for assisting a work performed by the work machine 1. The display 53 displays, for instance, terrain data and the present position of the cutting edge 13*p* of the bucket 13 (exemplary information regarding a position of a bucket) as the guide screen.

The controller 54 calculates a bucket angle θ3 based on the obtained data and displays the terrain data and the position of the cutting edge 13*p* of the bucket 13 on the display 53.

The controller 54 includes a processor such as a CPU (Central Processing Unit) and memories such as a RAM (Random Access Memory) and a ROM (Read Only Memory). The storage device 55 includes a semiconductor memory, a hard disk drive, or so forth. The storage device 55 is exemplified as a non-transitory recording medium readable by the controller 54. Computer commands executable by the processor have been recorded in the storage device 55 so as to estimate the position of the cutting edge 13*p* of the bucket 13 and display the position of the cutting edge 13*p*.

The position sensor 56 measures the position of the work machine 1. The position sensor 56 is disposed in the vehicle body 2. The position sensor 56 includes a GNSS (Global Navigation Satellite System) receiver 61, an antenna 62, and an IMU 63. The GNSS receiver 61 is, for instance, a receiver for GPS (Global Positioning System). The GNSS receiver 61 receives a measured position signal from a satellite and generates vehicle body position data by computing the position of the antenna 62 from the measured position signal. The controller 54 obtains the vehicle body position data (exemplary information regarding a position) from the GNSS receiver 61. The IMU 63 is an inertial measurement unit. The IMU 63 obtains tilt angle data (exemplary information regarding tilt). The tilt angle data includes an angle formed by the back-and-forth direction of the vehicle with respect to a horizontal plane (i.e., pitch angle) and an angle formed by the transverse direction of the vehicle with respect to the horizontal plane (i.e., roll angle).

Figure 6:
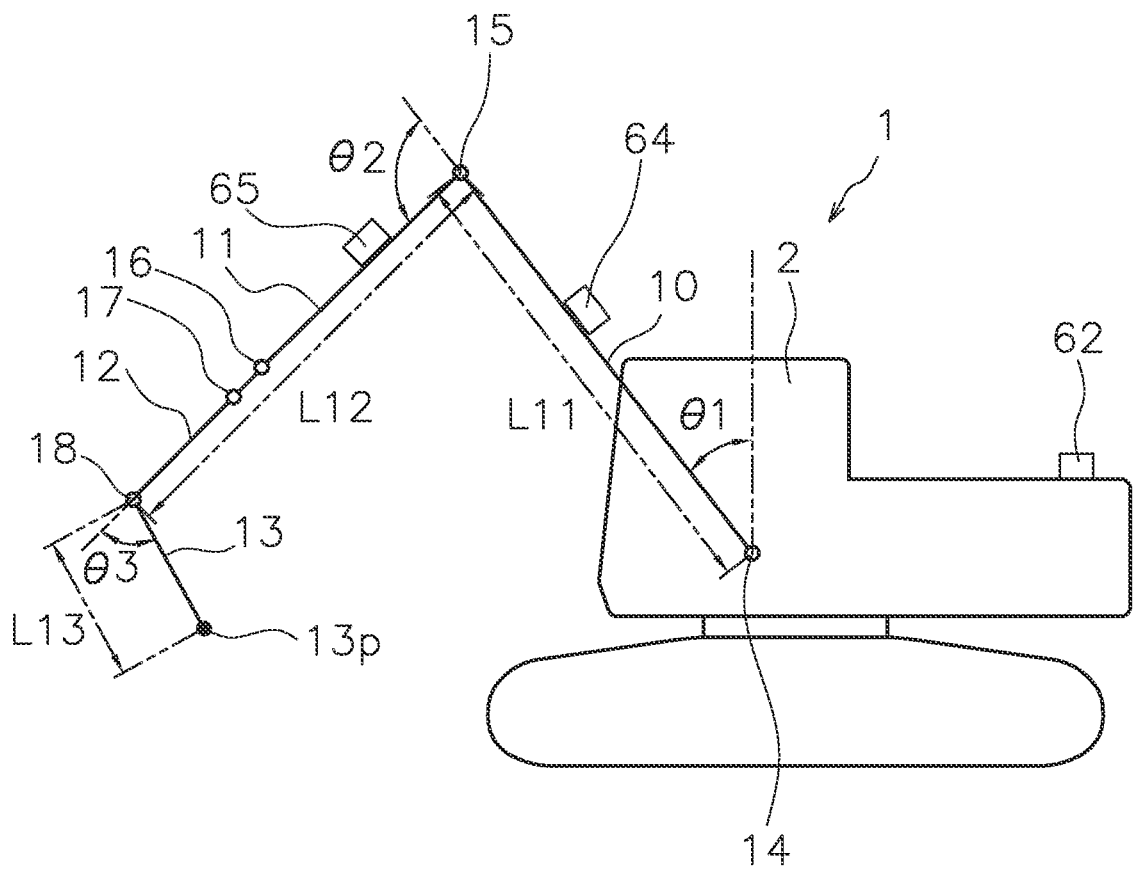
FIG. 6 is a diagram schematically showing a configuration of the work machine.

The posture sensor 57 detects posture data indicating the posture of the work implement 3. The posture sensor 57 includes a boom angle sensor 64 (exemplary third posture detector), an arm angle sensor 65 (exemplary second posture detector), and a bucket angle sensor 66 (exemplary first posture detector). The boom angle sensor 64 detects a boom angle θ1. FIG. 6 is a diagram schematically showing a configuration of the work machine 1. As shown in FIG. 6, the boom angle θ1 indicates the tilt angle of the boom 10 in the vehicle body 2. The arm angle sensor 65 detects an arm angle θ2. The arm angle θ2 indicates the tilt angle of the arm 11 with respect to the boom 10.

The boom angle sensor 64 is, for instance, an IMU and is disposed in the boom 10. The boom angle sensor 64 outputs a detection signal, indicating the boom angle, to the controller 54. The controller 54 calculates the boom angle θ1 from the tilt angle data of the vehicle body 2 and the detection signal herein described.

The arm angle sensor 65 is, for instance, an IMU and is disposed in the arm 11. The arm angle sensor 65 outputs a detection signal, indicating the arm angle, to the controller 54. The controller 54 calculates the arm angle θ2 from the tilt angle data of the vehicle body 2, the boom angle θ1, and the detection signal herein described.

It should be noted that the boom angle sensor 64 and the arm angle sensor 65 may be sensors for detecting the strokes of cylinders. In this case, the controller 54 calculates the boom angle θ1 and the arm angle θ2 based on the strokes of cylinders.

The bucket angle sensor 66 is an IMU. As shown in FIGS. 2 and 3, the bucket angle sensor 66 is attached to an outer lateral surface 35*b* (exemplary outer lateral surface) that is an outer one of the lateral surfaces of one of the third linkage members 35*a*. The bucket angle sensor 66 is accommodated inside an accommodation case 68. In the side view, an angle φ1, formed between a straight line L1 (exemplary third straight line) and the line segment L2, can be detected based on a value detected by the bucket angle sensor 66, where the straight line L1 is defined as a straight line connecting the arm pin 15 and the coupling pin 16; the line segment L2 is defined as a line segment passing through the center of the relevant third linkage member 35*a* (i.e., the line segment connecting the coupling pin 16 and the third linkage pin 38).

The value detected by the bucket angle sensor 66 is transmitted through a harness 67 to the controller 54 disposed in the vehicle body 2. The harness 67 extends out of the accommodation case 68 toward the vehicle body 2 along the lateral surface of the relevant third linkage member 35*a* and that of the arm 11. The harness 67 is preferably waterproof. Electric power is supplied to the bucket angle sensor 66 through the harness 67.

The storage device 55 stores the shape data of the vehicle body 2 and the shape data of the work implement 3. The shape data of the vehicle body 2 indicates the shape of the vehicle body 2. The shape data of the vehicle body 2 indicates a positional relation between the antenna 62 and a reference position set in the vehicle body 2. The shape data of the vehicle body 2 indicates a positional relation between the reference position set in the vehicle body 2 and the boom pin 14.

The shape data of the work implement 3 indicates the shapes of components of the work implement 3. The shape data of the work implement 3 includes the shape data of the first work implement 25 (exemplary data regarding a shape of a first work implement) and the shape data of the extension arm 12 (exemplary data regarding a shape of a second work implement).

The shape data includes boom length L11, arm length L12, and bucket length L13. The boom length L11 is the length from the boom pin 14 to the arm pin 15. The arm length L12 is the length from the arm pin 15 to the bucket pin 18. The bucket length L13 is the length from the bucket pin 18 to the cutting edge 13*p* of the bucket 13.

Besides, the shape data of the extension arm 12 includes the positional relations of the coupling pin 16, the bucket pin 18, and the first linkage pin 36 with respect to the arm pin 15, the length from the first linkage pin 36 to the second linkage pin 37, the length from the coupling pin 16 to the third linkage pin 38, and the length from the second linkage pin 37 to the third linkage pin 38.

On the other hand, the shape data of the bucket 13 includes the positional relation between the bucket pin 18 and the bucket linkage pin 46, the length from the bucket linkage pin 46 to the first linkage pin 36, and the positional relation between the bucket pin 18 and the cutting edge 13*p*.

The controller 54 calculates the bucket angle θ3 shown in FIG. 6 based on the angle φ1 obtained from the value detected by the bucket angle sensor 66. Now, in the side view, a straight line L3 is defined as a straight line connecting the arm pin 15 and the bucket pin 18, while the line segment L4 is defined as a line segment passing through the center of one of the first linkage members 33*a* (the line segment connecting the first linkage pin 36 and the second linkage pin 37).

When explained in detail, the controller 54 calculates the angle φ1 based on the value detected by the bucket angle sensor 66, the tilt angle data, both the boom angle θ1 and the arm angle θ2, and both the shape data of the work implement 3 and the shape data of the extension arm 12, and furthermore, calculates an angle φ2 formed between the straight line L3 (exemplary first straight line) and the straight line L4.

The controller 54 calculates the bucket angle θ3 based on the angle φ2, the shape data of the work implement 3, and the shape data of the extension arm 12. In the side view, the bucket angle θ3 is an angle formed between the straight line L3 and a straight line L5 (exemplary second straight line) connecting the bucket pin 18 and the cutting edge 13*p*.

As described above, the controller 54 obtains the boom angle θ1, the arm angle θ2, and the bucket angle θ3. The boom angle θ1, the arm angle θ2, and the bucket angle θ3 are included in the posture data.

The controller 54 calculates bucket position data from the vehicle body position data detected by the position sensor 56, based on the tilt angle data, the posture data, and the shape data. The bucket position data indicates, for instance, the position of the cutting edge 13*p* of the bucket 13. The bucket angle θ3 can be included in the bucket position data.

Figure 7:
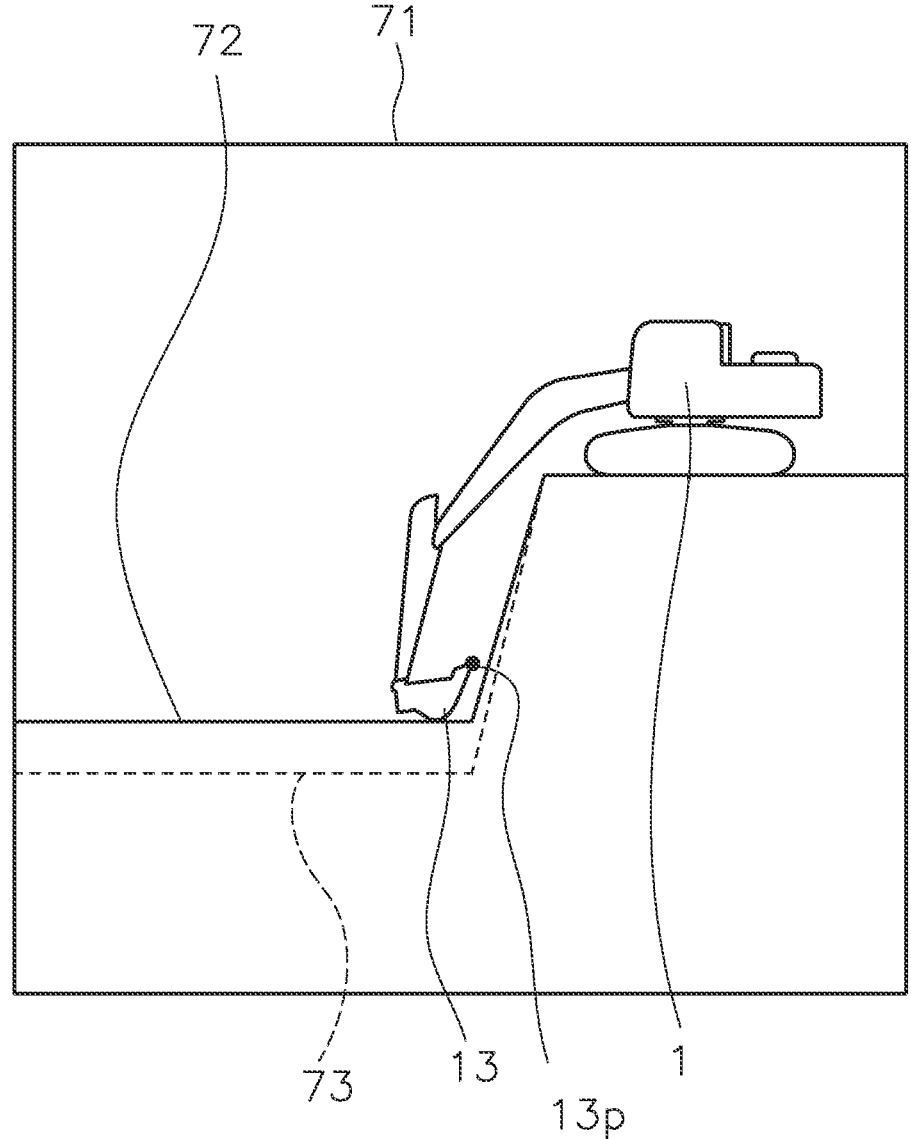
FIG. 7 is a diagram exemplifying a guide screen.

The storage device 55 stores present terrain data and designed terrain data. The present terrain data indicates the present status of the terrain in a work site. The designed terrain data indicates the target shape of the terrain in the work site. The controller 54 displays a guide screen 71 shown in FIG. 7 on the display 53 based on the present terrain data, the designed terrain data, and the shape data. As shown in FIG. 7, the guide screen 71 shows the present terrain 72, the designed terrain 73, and the position of the work machine 1. The shape data includes data indicating the shape of the bucket 13. The controller 54 displays the position of the bucket 13 with respect to the present terrain 72 and the designed terrain 73 on the guide screen 71 based on the shape data of the bucket 13 and the position of the cutting edge 13*p* of the bucket 13.

The guide screen 71 enables the operator of the work machine 1 to grasp the positional relations among the bucket 13, the present terrain 72, and the designed terrain 73.

(Features Etc.)

(1)

The position estimating system 50 according to the present preferred embodiment described above is a position estimating system estimating information regarding the position of the bucket 13 of the work machine 1 and includes the bucket angle sensor 66 and the controller 54. Here, the work machine 1 includes the vehicle body 2, the first work implement 25, and the extension arm 12. The first work implement 25 includes the arm 11, the bucket 13, and the bucket cylinder 21 driving the bucket 13 and is pivotable with respect to the vehicle body 2. The extension arm 12 includes the linkage mechanism 32 transferring driving of the bucket cylinder 21 to the bucket 13 and is attachable to the arm 11 and the bucket 13 in the position therebetween. The bucket angle sensor 66 is enabled to be disposed in the linkage mechanism 32. The controller 54 estimates the position of the cutting edge 13*p* of the bucket 13 with respect to the work machine 1 based on the shape data of the first work implement 25, the shape data of the extension arm 12, the information regarding the posture of the first work implement 25, and the value detected by the bucket angle sensor 66. As shown in FIG. 2, the extension arm 12 includes the extension part 31. The extension part 31 includes the distal end portion 31*a* connectable to the bucket 13 and the base end portion 31*b* connectable to the arm 11. The linkage mechanism 32 includes the first linkage part 33, the second linkage member 34, and the third linkage part 35. The first linkage part 33 is connected to the extension part 31 through the first linkage pin 36 and is connectable through the second linkage pin 37 to the bucket linkage part 47 connected to the bucket 13. The second linkage member 34 is connected to the first linkage part 33 through the second linkage pin 37 and extends toward the side of the base end portion 31*b*. The third linkage part 35 is disposed closer to the base end portion 31*b* than the first linkage part 33, is connected to the extension part 31 through the coupling pin 16, and is connected to the second linkage member 34 through the third linkage pin 38.

Thus, the bucket angle sensor 66 is disposed in the linkage mechanism 32, whereby chances of submergence of the bucket angle sensor 66 can be reduced in such a work as dredging; hence, the position estimating system 50 can be made unlikely to be affected by works.

(2)

In the position estimating system 50 according to the present preferred embodiment, the bucket angle sensor 66 is disposed in the third linkage part 35.

Thus, the bucket angle sensor 66 is provided in the third linkage part 35 disposed closer to the arm 11; hence, the chances of submergence of the bucket angle sensor 66 can be further reduced. Besides, waterproof performance required for the accommodation case 68 can be achieved with a simple and easy configuration.

Moreover, the harness 67 extending from the bucket angle sensor 66 to the vehicle body 2 can be more reduced in length than when the bucket angle sensor 66 is provided in another position within the linkage mechanism 32.

Furthermore, a detachment/attachment procedure is assumed as follows: after detachment of the extension arm 12 including the third linkage part 35, the third linkage part 35 is connected to the arm 11 and then the bucket 13 is attached to the arm 11. In this procedure, a replacement work is made unnecessary for the bucket angle sensor 66 and the harness 67 extending from the bucket angle sensor 66, and so forth; hence, a detachment/attachment work is made easy.

Figure 8:
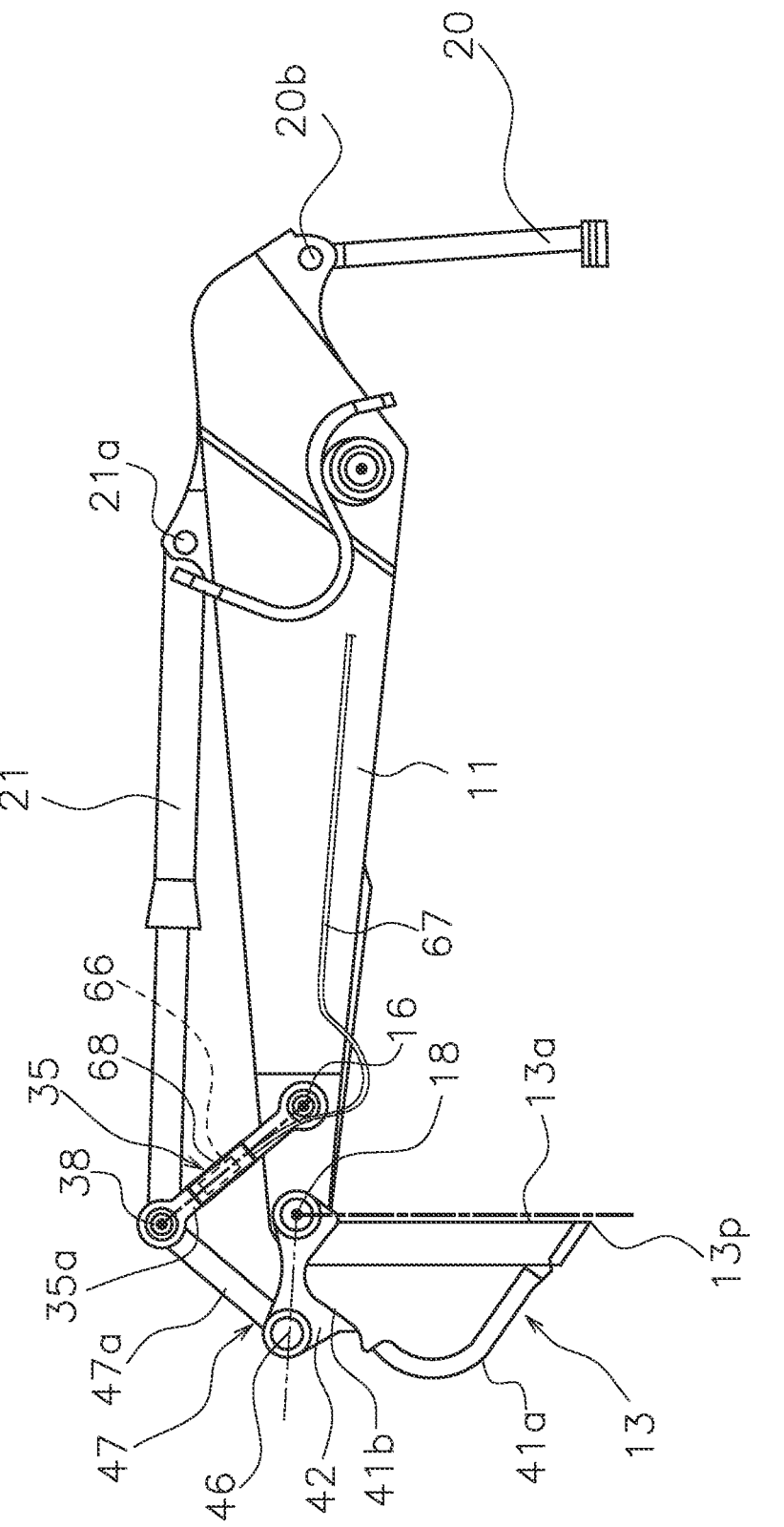
FIG. 8 is a side view of a first work implement in a condition that an extension arm, except for a third linkage part, is detached from the work implement in the preferred embodiment according to the present disclosure.

FIG. 8 is a diagram showing a condition that the extension arm 12, except for the third linkage part 35, is detached from the position between the bucket 13 and the arm 11. In the configuration shown in FIG. 8, the bucket linkage member 47*a* is rotatably connected to the third linkage members 35*a* through the third linkage pin 38. The bucket pin 18 is disposed in the portion that the coupling pin 17 of the arm 11 has been disposed in the preferred embodiment; besides, the bucket 13 is rotatably connected to the arm 11 through the bucket pin 18. Thus, regardless of attachment or detachment of the extension arm 12, the bucket angle sensor 66 can be kept disposed in the third linkage part 35; hence, attachment and detachment of the extension arm 12 can be performed simply and easily without requiring such a work as sensor replacement.

(3)

In the position estimating system 50 according to the present preferred embodiment, the bucket angle sensor 66 is disposed on the outer lateral surface 35*b* of the third linkage part 35.

Accordingly, maintenance and replacement of the bucket angle sensor 66 is made easy.

(4)

In the position estimating system 50 according to the present preferred embodiment, the information regarding the position of the bucket 13 includes the bucket angle θ3 defined as an angle of the straight line L5 connecting the cutting edge 13*p* of the bucket 13 and the bucket pin 18 with respect to the straight line L3 connecting the bucket pin 18 coupling the bucket 13 to the extension part 31 and the arm pin 15 functioning as a pivot point (fulcrum) of the arm 11. The controller 54 calculates the angle of rotation φ1 of the third linkage part 35 with respect to the straight line L1 connecting the coupling pin 16 coupling the extension part 31 to the arm 11 and the arm pin 15 based on the value detected by the bucket angle sensor 66, calculates the angle of rotation φ2 of the first linkage part 33 with respect to the straight line L3 based on the angle of rotation φ1 of the third linkage part 35, and calculates the bucket angle θ3 based on the angle of rotation φ2 of the first linkage part 33.

Thus, the angle of rotation φ2 of the first linkage part 33 is calculated based on the angle of rotation φ1 of the third linkage part 35, whereby the bucket angle θ3 can be estimated.

(5)

In the position estimating system 50 according to the present preferred embodiment, the first work implement 25 further includes the boom 10 connected to the vehicle body 2 and the arm 11. The position estimating system 50 further includes the arm angle sensor 65 and the boom angle sensor 64. The arm angle sensor 65 detects the posture of the arm 11. The boom angle sensor 64 detects the posture of the boom 10. The controller 54 estimates the position of the bucket 13 based on the estimated bucket angle θ3, the value detected by the arm angle sensor 65, and the value detected by the boom angle sensor 64.

Accordingly, the position of the bucket 13 can be estimated with the bucket angle θ3.

(6)

The position estimating system 50 according to the present preferred embodiment further includes the position sensor 56. The position sensor 56 detects the information regarding the position and the tilt of the vehicle body 2. The controller 54 estimates the position of the bucket 13 based on the information regarding the position of the bucket 13 with respect to the work machine 1 and the value detected by the position sensor 56.

Accordingly, the position of the bucket 13 can be estimated in the global coordinate system.

(7)

The work machine 1 according to the present preferred embodiment includes the vehicle body 2, the first work implement 25, the extension arm 12, the bucket angle sensor 66, and the controller 54. The first work implement 25 includes the arm 11, the bucket 13, and the bucket cylinder 21 driving the bucket 13 and is pivotable with respect to the vehicle body 2. The extension arm 12 includes the linkage mechanism 32 transferring driving of the bucket cylinder 21 to the bucket 13 and is attachable to the arm 11 and the bucket 13 in the position therebetween. The bucket angle sensor 66 is disposed in the linkage mechanism 32. The controller 54 estimates the bucket angle θ3 with respect to the vehicle body 2 based on the shape data of the first work implement 25, the shape data of the extension arm 12, the information regarding the posture of the first work implement 25, and the value detected by the bucket angle sensor 66. The extension arm 12 includes the extension part 31. The extension part 31 includes the distal end portion 31*a* connectable to the bucket 13 and the base end portion 31*b* connectable to the arm 11. The linkage mechanism 32 includes the first linkage part 33, the second linkage member 34, and the third linkage part 35. The first linkage part 33 is connected to the extension part 31 through the first linkage pin 36 and is connectable through the second linkage pin 37 to the bucket linkage part 47 connected to the bucket 13. The second linkage member 34 is connected to the first linkage part 33 through the second linkage pin 37 and extends toward the side of the base end portion 31*b*. The third linkage part 35 is disposed closer to the base end portion 31*b* than the first linkage part 33, is connected to the extension part 31 through the coupling pin 16, and is connected to the second linkage member 34 through the third linkage pin 38.

Thus, the bucket angle sensor 66 is disposed in the linkage mechanism 32, whereby chances of submergence of the bucket angle sensor 66 can be reduced in such a work as dredging; hence, the work machine 1 can be made unlikely to be affected by works.

(8)

The extension unit according to the present preferred embodiment includes the extension arm 12 and the bucket angle sensor 66. The extension arm 12 is attachable to the arm 11 and the bucket 13 of the work machine 1 in the position therebetween. The work machine 1 herein includes the vehicle body 2 and the first work implement 25. The first work implement 25 includes the arm 11, the bucket 13, and the bucket cylinder 21 driving the bucket 13 and is pivotable with respect to the vehicle body 2. The bucket angle sensor 66 is disposed in the extension arm 12. The extension arm 12 includes the extension part 31 and the linkage mechanism 32. The extension part 31 includes the distal end portion 31a connectable to the bucket 13 and the base end portion 31b connectable to the arm 11. The linkage mechanism 32 transfers driving of the bucket cylinder 21 to the bucket 13. The linkage mechanism 32 includes the first linkage part 33, the second linkage member 34, and the third linkage part 35. The first linkage part 33 is connected to the extension part 31 through the first linkage pin 36 and is connectable through the second linkage pin 37 to the bucket linkage part 47 connected to the bucket 13. The second linkage member 34 is connected to the first linkage part 33 through the second linkage pin 37 and extends toward the side of the base end portion 31b. The third linkage part 35 is disposed closer to the base end portion 31b than the first linkage part 33, is connected to the extension part 31 through the coupling pin 16, and is connected to the second linkage member 34 through the third linkage pin 38.

With the configuration, it is made possible to provide the extension arm 12 that the bucket angle sensor 66 is disposed in the linkage mechanism 32.

OTHER PREFERRED EMBODIMENTS

One preferred embodiment of the present invention has been explained above. However, the present invention is not limited to the preferred embodiment described above, and a variety of changes can be made without departing from the gist of the present invention.

(A)

In the preferred embodiment described above, the bucket angle sensor 66 is disposed in the third linkage part 35; besides, the value detected by the bucket angle sensor 66 has been preliminarily set to be obtained by the controller 54. Alternatively, the bucket angle sensor 66 may be retrofitted to an existing work machine to which an extension arm is attachable. In this case, the bucket angle sensor 66, the harness 67, and a sensor controller 81 (exemplary detector controller) for controlling the bucket angle sensor 66 can be provided for the existing work machine as a position estimating unit 80.

As shown in FIG. 9A, the sensor controller 81 may obtain a value Vd detected by the bucket angle sensor 66 and may transmit the detected value Vd (exemplary information based on a detected value) to the controller 54 in the vehicle body 2 through the harness 67. The controller 54 calculates the bucket angle θ3 from the detected value Vd.

As shown in FIG. 9B, the sensor controller 81 may obtain the detected value Vd of the bucket angle sensor 66 and may calculate the angle φ1 from the detected value Vd based on the tilt angle data, both the boom angle θ1 and the arm angle θ2, the shape data of the work implement 3, and the shape data of the extension arm 12. The data of the angle φ1 (exemplary information based on the detected value) is transmitted from the sensor controller 81 through the harness 67 to the controller 54 in the vehicle body 2. The controller 54 calculates the bucket angle θ3 from the data of the angle φ1. In this case, the sensor controller 81 obtains data for calculating the angle φ1.

Alternatively, as shown in FIG. 9C, the sensor controller 81 may calculate the angle φ2 from the detected value Vd obtained from the bucket angle sensor 66 based on the tilt angle data, both the boom angle θ1 and the arm angle θ2, the shape data of the work implement 3, and the shape data of the extension arm 12. The data of the angle φ2 (exemplary information based on the detected value) is transmitted from the sensor controller 81 through the harness 67 to the controller 54 in the vehicle body 2. The controller 54 calculates the bucket angle θ3 from the data of the angle φ2. In this case, the sensor controller 81 obtains data for calculating the angle φ2.

Yet alternatively, the sensor controller 81 may calculate the bucket angle θ3 from the value detected by the bucket angle sensor 66 and may transmit the data of the bucket angle θ3 (exemplary information based on the detected value) to the controller 54 in the vehicle body 2.

It should be noted that the sensor controller 81 includes a processor such as a CPU (Central Processing Unit), memories such as a RAM (Random Access Memory) and a ROM (Read Only Memory), and a storage device. The storage device includes a semiconductor memory, a hard disk drive, or so forth. The storage device is exemplified as a non-transitory recording medium readable by the sensor controller 81. Computer commands executable by the processor have been recorded in the storage device so as to execute the controls described above.

With the configuration herein described, even when the extension arm 12 is attached to the existing work machine, the position of the cutting edge 13p of the bucket 13 can be obtained by retrofitting the position estimating unit 80 to the existing work machine.

(B)

In the linkage mechanism 32 of the extension arm 12 according to the preferred embodiment described above, the line segment L4 from the first linkage pin 36 to the second linkage pin 37 and the line segment L2 from the coupling pin 16 to the third linkage pin 38 are different in length from each other, but alternatively, may be equal in length to each other.

Figure 10:
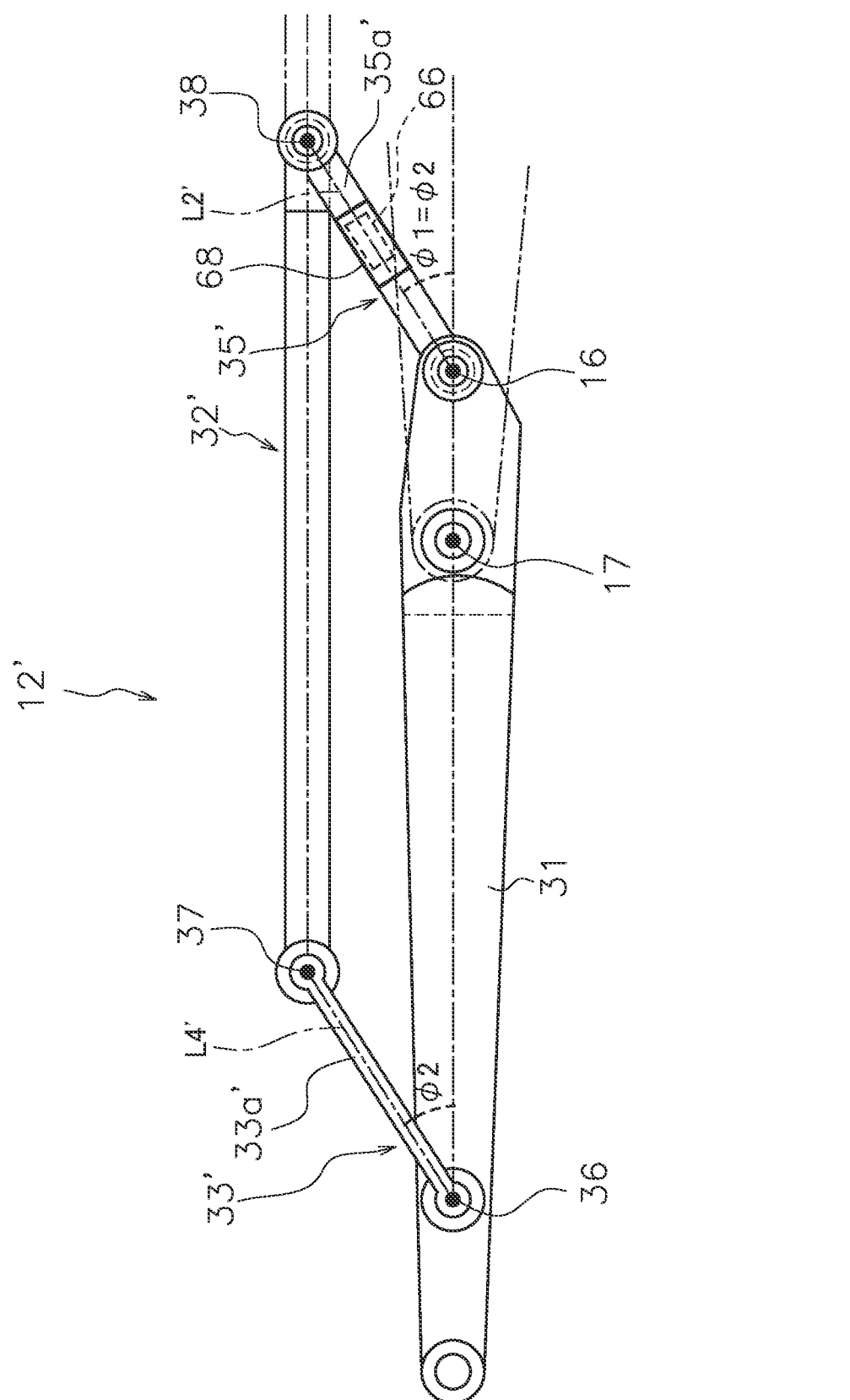
FIG. 10 is a side view of an extension arm including a linkage mechanism in another preferred embodiment according to the present disclosure.

FIG. 10 is a diagram showing an extension arm 12' including a linkage mechanism 32' made in form of a parallelogram linkage. It should be noted that in FIG. 10, the harness 67 is omitted in illustration.

In the extension arm 12' shown in FIG. 10, each of third linkage members 35a' of a third linkage part 35' is configured to be equal in length to each of first link members 33a' of a first linkage part 33'; hence, a line segment L4' from the first linkage pin 36 to the second linkage pin 37 is configured to be equal in length to a line segment L2' from the coupling pin 16 to the third linkage pin 38.

In this case, the angle φ1 is made equal in value to the angle φ2; hence, the bucket angle θ3 can be calculated from the angle φ1 based on the shape data of the bucket 13.

Because of this, it is not required to estimate the angle φ2 from the angle φ1 by computation; hence, more accurate estimation can be made for the bucket angle θ3.

(C)

In the preferred embodiment described above, the bucket angle sensor 66 is disposed on the outer lateral surface 35b (see FIG. 3) of one of the third linkage members 35a; however, the bucket angle sensor 66 is not limited in installation position to this.

Figures 11A, 11B:
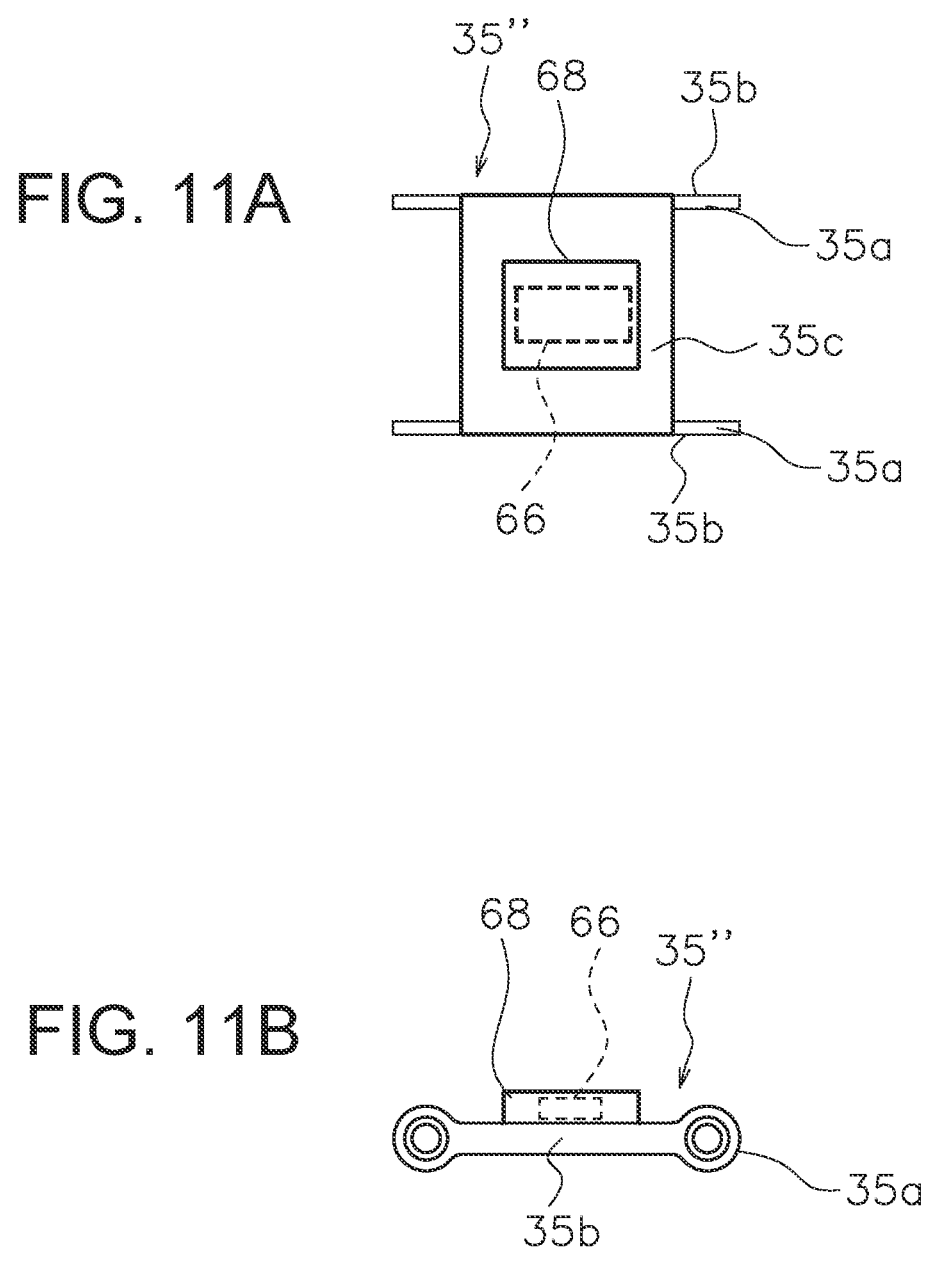

FIG. 11A is a plan view of the accommodation case 68 and a third linkage part 35". FIG. 11B is a side view of the accommodation case 68 and the third linkage part 35".

As shown in FIGS. 11(*a*) and (*b*), a connection portion 35*c* is provided for connecting the pair of third linkage members 35*a*; besides, the accommodation case 68 is attached to the top surface of the connection portion 35*c*, while accommodating the bucket angle sensor 66 therein. Thus, the bucket angle sensor 66 may be disposed on a position other than the lateral surface 35*b* of one of the third linkage members 35*a* in the third linkage part 35".

(D)

In the preferred embodiment described above, the position of the cutting edge 13*p* of the bucket 13 is estimated as the information regarding the position of the bucket; however, the information regarding the position of the bucket may not be limited to the position of the cutting edge 13*p*. Alternatively, any position other than the cutting edge 13*p* on the bucket 13 may be estimated. Based on the estimated position and the shape data of the bucket 13, the posture of the bucket 13 can be displayed on the guide screen 71.

(E)

The work machine 1 is not limited to the hydraulic excavator described above; alternatively, the work machine 1 may be another type of machine such as a mechanical shovel or a rope shovel. The work machine 1 according to the preferred embodiment described above is an excavator of a so-called backhoe type, but alternatively, may be an excavator of a face shovel type. Besides, the work machine 1 is not limited to the crawler excavator, and alternatively, may be a wheeled excavator.

According to the present disclosure, it is made possible to provide a position estimating system, a position estimating unit, a work machine, and an extension unit, all of which are unlikely to be affected by works.

The invention claimed is:

1. A position estimating system estimating information regarding a position of a bucket of a work machine, the work machine including a work machine body, a first work implement, and a second work implement, the first work implement including an arm, the bucket, and a bucket cylinder driving the bucket, the first work implement pivotable with respect to the work machine body, the second work implement including a linkage mechanism transferring driving of the bucket cylinder to the bucket, the second work implement attachable to the arm and the bucket in a position therebetween, the position estimating system comprising:

a first posture detector enabled to be disposed in the linkage mechanism; and a controller configured to estimate information regarding the position of the bucket with respect to the work machine based on data regarding a shape of the first work implement, data regarding a shape of the second work implement, information regarding a posture of the first work implement, and a value detected by the first posture detector, the second work implement including an extension part, the extension part including a first end portion connectable to the bucket and a second end portion connectable to the arm, the second end portion being fixed to the arm, and the extension part extending in a longitudinal direction of the arm so as to extend the arm, and the linkage mechanism including a first linkage part connected to the extension part through a first coupling portion, the first linkage part connectable through a second coupling portion to a bucket linkage part connected to the bucket, a second linkage part connected to the first linkage part through the second coupling portion, the second linkage part extending toward a side of the second end portion, the second linkage part being arranged side-by-side with respect to the extension part in a direction perpendicular to a longitudinal direction of the extension part, and a third linkage part disposed closer to the second end portion than the first linkage part, the third linkage part connected to the extension part through a third coupling portion, the third linkage part connected to the second linkage part through a fourth coupling portion.

2. The position estimating system according to claim 1, wherein the first posture detector is disposed on the third linkage part between the third coupling portion and the fourth coupling portion.

3. The position estimating system according to claim 2, wherein the first posture detector is disposed on an outer lateral surface of the third linkage part.

4. The position estimating system according to claim 2, wherein the information regarding the position of the bucket includes a bucket angle defined as an angle of a second straight line with respect to a first straight line, the first straight line connecting a bucket pin coupling the bucket to the extension part and an arm pin functioning as a pivot point of the arm, the second straight line connecting a cutting edge of the bucket and the bucket pin, the controller is configured to calculate an angle of rotation of the third linkage part with respect to a third straight line based on the value detected by the first posture detector, the third straight line connecting a coupling pin coupling the extension part to the arm and the arm pin, the controller is configured to calculate an angle of rotation of the first linkage part with respect to the first straight line based on the angle of rotation of the third linkage part, and the controller is configured to calculate the bucket angle based on the angle of rotation of the first linkage part.

5. The position estimating system according to claim 4, further comprising:

a second posture detector configured to detect a posture of the arm, and a third posture detector, the first work implement further including a boom connected to the work implement body and the arm, the third posture detector being configured to detect a posture of the boom, and the controller being configured to estimate the position of the bucket based on the bucket angle estimated thereby, a value detected by the second posture detector, and a value detected by the third posture detector.

6. The position estimating system according to claim 1, wherein the linkage mechanism is a parallelogram linkage.

7. The position estimating system according to claim 1, further comprising:

a status detector configured to detect a position and a tilt of the work machine body, the controller being configured to estimate the position of the bucket based on the information regarding the position of the bucket with respect to the work machine and a value detected by the status detector.

8. The position estimating system according to claim 1, wherein the first posture detector is an IMU (Inertial Measurement Unit).

9. A position estimating unit estimating information regarding a position of a bucket of a work machine, the work machine including a work machine body, a first work implement, and a second work implement, the first work implement including an arm, the bucket, and a bucket cylinder driving the bucket, the first work implement pivotable with respect to the work machine body, the second work implement including a linkage mechanism transferring driving of the bucket cylinder to the bucket, the second work implement attachable to the arm and the bucket in a position therebetween, the position estimating unit comprising:

a first posture detector enabled to be disposed in the linkage mechanism; and a detector controller configured to obtain a value detected by the first posture detector, the detector controller configured to transmit information based on the value detected by the first posture detector to the work machine body, the second work implement including an extension part, the extension part including a first end portion connectable to the bucket and a second end portion connectable to the arm, the second end portion being fixed to the arm, and the extension part extending in a longitudinal direction of the arm so as to extend the arm, and the linkage mechanism including a first linkage part connected to the extension part through a first coupling portion, the first linkage part connectable through a second coupling portion to a bucket linkage part connected to the bucket, a second linkage part connected to the first linkage part through the second coupling portion, the second linkage part extending toward a side of the second end portion, the second linkage part being arranged side-by-side with respect to the extension part in a direction perpendicular to a longitudinal direction of the extension part, and a third linkage part disposed closer to the second end portion than the first linkage part, the third linkage part connected to the extension part through a third coupling portion, the third linkage part connected to the second linkage part through a fourth coupling portion.

10. A work machine comprising:

a work machine body;

a first work implement including an arm, a bucket, and a bucket cylinder driving the bucket, the first work implement pivotable with respect to the work machine body;

a second work implement including a linkage mechanism transferring driving of the bucket cylinder to the bucket, the second work implement attachable to the arm and the bucket in a position therebetween;

a first posture detector disposed in the linkage mechanism; and a controller configured to estimate information regarding a position of the bucket with respect to the work machine body based on data regarding a shape of the first work implement, data regarding a shape of the second work implement, information regarding a posture of the first work implement, and a value detected by the first posture detector, the second work implement including an extension part, the extension part including a first end portion connectable to the bucket and a second end portion connectable to the arm, the second end portion being fixed to the arm, and the extension part extending in a longitudinal direction of the arm so as to extend the arm, and the linkage mechanism including a first linkage part connected to the extension part through a first coupling portion, the first linkage part connectable through a second coupling portion to a bucket linkage part connected to the bucket, a second linkage part connected to the first linkage part through the second coupling portion, the second linkage part extending toward a side of the second end portion, the second linkage part being arranged side-by-side with respect to the extension part in a direction perpendicular to a longitudinal direction of the extension part, and a third linkage part disposed closer to the second end portion than the first linkage part, the third linkage part connected to the extension part through a third coupling portion, the third linkage part connected to the second linkage part through a fourth coupling portion.

11. An extension unit comprising:

an extension arm attachable to an arm and a bucket of a work machine in a position therebetween, the work machine including a work machine body and a first work implement, the first work implement including the arm, the bucket, and a bucket cylinder driving the bucket, the first work implement pivotable with respect to the work machine body; and a first posture detector disposed in the extension arm, the extension arm including an extension part including a first end portion connectable to the bucket and a second end portion connectable to the arm, the second end portion being fixed to the arm, and the extension part extending in a longitudinal direction of the arm so as to extend the arm, and a linkage mechanism transferring driving of the bucket cylinder to the bucket, and the linkage mechanism including a first linkage part connected to the extension part through a first coupling portion, the first linkage part connectable through a second coupling portion to a bucket linkage part connected to the bucket, a second linkage part connected to the first linkage part through the second coupling portion, the second linkage part extending toward a side of the second end portion, the second linkage part being arranged side-by-side with respect to the extension part in a direction perpendicular to a longitudinal direction of the extension part, and a third linkage part disposed closer to the second end portion than the first linkage part, the third linkage part connected to the extension part through a third coupling portion, the third linkage part connected to the second linkage part through a fourth coupling portion.

* * * * *